Dec. 31, 1929.  E. E. AYRES, JR  1,741,394
MANUFACTURE OF GLYOXAL AND GLYCOLLIC ACID
Filed Nov. 28, 1927
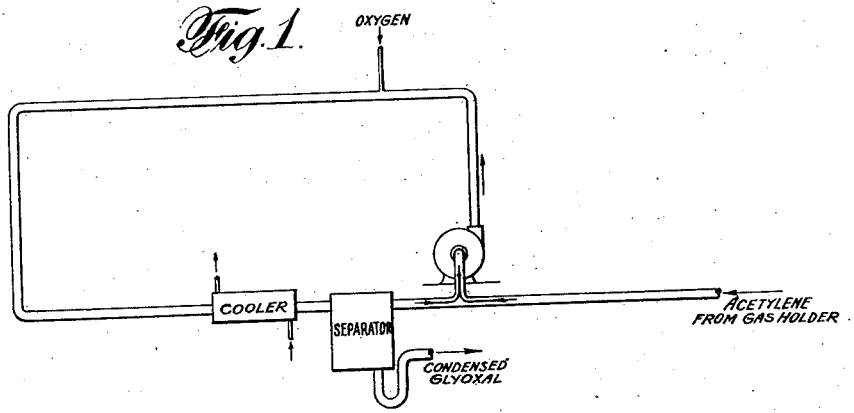
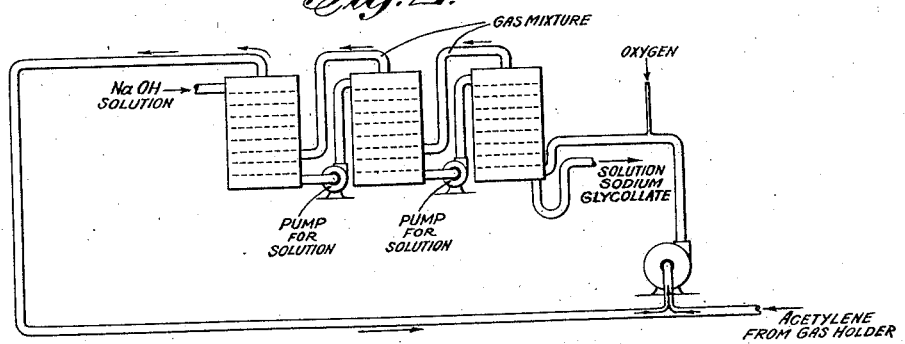

Patented Dec. 31, 1929

1,741,394

UNITED STATES PATENT OFFICE

EUGENE E. AYRES, JR., OF CHESTER, PENNSYLVANIA, ASSIGNOR TO THE B. A. S. COMPANY, OF PHILADELPHIA, PENNSYLVANIA, A CORPORATION OF DELAWARE

MANUFACTURE OF GLYOXAL AND GLYCOLLIC ACID

Application filed November 28, 1927. Serial No. 236,136.

This invention relates to a process whereby glyoxal is manufactured and by further treatment is converted into glycollic acid and therefore the invention relates to the manufacture of glyoxal and glycollic acid as separate products. Also, certain steps of the process of this invention result in the production of sodium glycollate as an intermediate product.

Glyoxal and glycollic acid and their derivatives are useful in the arts, sodium glycollate being useful, among other things, for the manufacture of ethyl glycollate which has properties rendering it suitable as a nitrocellulose solvent, but prior methods of manufacture have been unsatisfactory. Thus the production of glyoxal by oxidation of glycol, alcohol or aldehyde with nitric acid requires particular conditions, and its production from acetylene by auric chloride was impractical. Again, the production of glycollic acid by oxidation of glycol produced a mixture of several products difficult to isolate.

I have found that glyoxal can be made economically and efficiently by reacting acetylene directly with oxygen under conditions that are produced by simple apparatus and are readily maintained; and I have found that glyoxal so produced is advantageously utilized as an intermediate product in the manufacture of glycollic acid. Oxygen and acetylene react so readily that improper procedure in such reaction results in an explosion. However, I have found that the direct reaction of acetylene with oxygen with the production of glyoxal can be safely carried out by passing the acetylene through a conduit at high velocity and introducing oxygen into the stream of acetylene at a low rate as compared with the volume of acetylene passing along in the stream. In the practice of my invention it is advisable that the pressure of the acetylene and of the mixture shall be merely nominal and preferably only such pressure as may be necessary to maintain the flow. Moreover, the reaction is exo-thermic, the amount of heat developed being dependent upon the amount of oxygen admitted, and by cooling the mixture glyoxal is condensed out of the mixed gases. The uncondensed gases together with fresh quantities of acetylene are recirculated through the mixing and cooling apparatus. The uncondensed gases so returned to the mixing device contain acetylene but they also contain glyoxal in vapor form because it is disadvantageous from a practical point of view to completely separate the glyoxal from the acetylene passing from the cooler. Instead, it is preferable to permit the glyoxal to accumulate as a vapor in the acetylene circulating through the system until the concentration of the glyoxal is great enough to permit it to be condensed by ordinary cooling at the moderate pressures employed. As glyoxal is condensed from the gases and removed from the system, acetylene is added to make up the original volume of circulating gases.

The glyoxal is formed by the direct union of acetylene and oxygen, as follows:

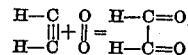

No by-products are formed in the practice of my invention except by the oxidation of some of the glyoxal, which is unimportant because glyoxal is relatively not readily oxidized.

When glycollic acid is desired the glyoxal may be treated with caustic soda to form sodium glycollate from which glycollic acid may be produced by acidulation with sulphuric acid.

In the practice of my invention it is convenient to pass the gases coming from the mixing device, through towers in which the gases are scrubbed with caustic soda solution. The gases passing from the towers are advantageously returned to the mixing device, being cooled by the washing operation, and the liquid withdrawn from the towers is a solution of sodium glycollate that is approximately neutral. The reaction involved is:

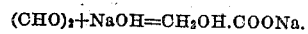

A specific example of the application of my invention, to which I do not wish to be limited but which I set forth as a mere illustration, is:

Acetylene was passed through a one inch iron pipe at a velocity of approximately one hundred and fifty feet per second and into the side of the first pipe oxygen was passed through a quarter inch pipe at such a rate as to mix one part by volume of oxygen with ten parts by volume of acetylene. This proportion caused the development of moderate heat which was removed by a water cooled condenser. The circulation of gases was maintained by means of a centrifugal vapor pump developing only sufficient pressure to overcome frictional resistance.

Instead of the water cooled condenser, scrubbing towers were employed through which the 20% solution of caustic soda was flowed counter-current to the gases coming from the mixing point.

The liquid coming from the condenser was glyoxal and the liquid coming from the towers was a nearly neutral solution of sodium glycollate.

The size of the pipes employed may be varied and the velocity of the acetylene may be varied and the proportion of oxygen to acetylene may be varied, but it is desirable to pass the acetylene along at a high velocity at the mixing point and to cool the mixture promptly in either a condenser or in towers. Furthermore, the proportion of acetylene to oxygen should preferably not be lower than five parts of acetylene to one part of oxygen by volume, but very high proportions of acetylene to oxygen are undesirable in that they greatly reduce the capacity of the apparatus.

In the drawings, apparatus whereby my invention may be practiced is shown, Fig. 1 being a diagrammatic showing of apparatus for the production of glyoxal in accordance with my process; and Fig. 2 being a diagrammatic showing of apparatus for the production of sodium glycollate in accordance with my process.

In the drawings acetylene from any suitable source is introduced through pipe 1 at suitable velocity and is passed by pump 2 through pipe 3. Oxygen is admitted to pipe 3 by pipe 4 and the mixture is passed at high velocity to cooler 5 and condensed glyoxal is removed by separator 6 while uncondensed vapors are passed by pipe 7 back to pump 2 for recirculation through the system.

In the construction shown in Fig. 2, the scrubbing towers 7 replace the cooler 5 shown in Fig. 1 and cool the gases while converting the glyoxal into sodium glycollate. The gases coming from the mixing point into the bottom of the first scrubbing tower are passed from the top of each tower to the bottom of the next while a caustic soda solution is introduced at the top of the last tower and pumped from the bottom of each tower to the top of the next. Gases from the top of the last tower are returned by pipe 7' to pump 2 for circulation through the mixing device. The liquid withdrawn from the bottom of the first tower through trap 6' is sodium glycollate solution.

Obviously changes may be made in the apparatus to meet existing conditions and it is intended that my invention shall include such modifications and variations as fall within the appended claims. The towers may be of any suitable form and construction providing unobstructed flow of gases in contact with caustic soda solution. Other suitable alkaline solutions may be employed instead of caustic soda solution.

What I claim as new and desire to secure by Letters Patent of the United States is:

1. The method comprising reacting acetylene gas directly with ordinary oxygen and thereby forming glyoxal.

2. The method comprising forming glyoxal by passing oxygen into acetylene gas in the proportion of one part of oxygen to not less than five parts of acetylene.

3. The method comprising forming glyoxal by passing ordinary oxygen into acetylene gas and cooling the resulting products.

4. The method comprising forming glyoxal by passing oxygen into acetylene gas in the proportion of one part of oxygen to not less than five parts of acetylene, and cooling the resulting products.

5. The method comprising forming glyoxal by passing acetylene through a conduit at high velocity and introducing oxygen into the moving stream of acetylene.

6. The method comprising forming glyoxal by passing acetylene through a conduit at high velocity and introducing oxygen into the moving stream of acetylene, and cooling the resulting products.

7. The method comprising forming glyoxal by passing acetylene through a conduit at high velocity and introducing oxygen into the moving stream of acetylene in the proportion of one part of oxygen to not less than five parts of acetylene.

8. The method comprising forming glyoxal by passing acetylene through a conduit at high velocity and introducing oxygen into the moving stream of acetylene in the proportion of one part of oxygen to not less than five parts of acetylene, cooling the resulting products, withdrawing glyoxal from the cooled products, and returning uncondensed products to the mixing step.

9. The method comprising forming glyoxal by continuously circulating acetylene at high velocity through a cooling zone while separately introducing oxygen and acetylene to the circulating products.

10. The method comprising continuously circulating acetylene at high velocity through a cooling zone, while adding additional acetylene to the circulating gases leaving the zone, introducing oxygen to the gases entering the cooling zone, and withdrawing condensed glyoxal from the circulating products after their passage through the cooling zone.

11. The method comprising reacting acetylene gas directly with oxygen and cooling the resulting products by contact with caustic soda solution to produce sodium glycollate.

12. The method comprising continuously circulating acetylene at high velocity into contact with cool caustic soda solution while separately introducing oxygen and additional acetylene to the circulating gases.

13. The method comprising continuously circulating acetylene at high velocity countercurrent to and in contact with a stream of caustic soda solution while introducing fresh acetylene to gases having contact with the solution and introducing oxygen in small proportion to gases passing to contact with the solution.

In testimony whereof, I have signed my name to this specification.

EUGENE E. AYRES, Jr.